US009396081B1

(12) United States Patent
Ostler

(10) Patent No.: US 9,396,081 B1
(45) Date of Patent: Jul. 19, 2016

(54) METHOD, APPARATUS AND SYSTEM FOR MANAGING QUEUE OPERATIONS OF A TEST BENCH ENVIRONMENT

(71) Applicant: Sandia Corporation, Albuquerque, NM (US)

(72) Inventor: Farrell Lynn Ostler, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 168 days.

(21) Appl. No.: 14/264,186

(22) Filed: Apr. 29, 2014

(51) Int. Cl.
*G06F 11/00* (2006.01)
*G06F 11/26* (2006.01)
*G06F 11/36* (2006.01)

(52) U.S. Cl.
CPC ............ *G06F 11/26* (2013.01); *G06F 11/3664* (2013.01); *G06F 11/3672* (2013.01)

(58) Field of Classification Search
CPC ... G06F 11/26; G06F 11/3672; G06F 11/261; G06F 11/263; G06F 11/3664; G06F 11/3688; G06F 11/3696
USPC ........................ 714/25, 27, 32, 33, 37, 40, 45
See application file for complete search history.

(56) References Cited

U.S. PATENT DOCUMENTS

| | | | | | |
|---|---|---|---|---|---|
| 7,337,431 | B1 * | 2/2008 | Barnes | G06F 11/3664 714/E11.207 |
| 2009/0307763 | A1 * | 12/2009 | Rawlins | G06F 11/2294 726/5 |
| 2014/0109055 | A1 * | 4/2014 | Gibbens | G06F 11/3672 717/125 |
| 2014/0115394 | A1 * | 4/2014 | Fattah | G06F 11/26 714/32 |

* cited by examiner

*Primary Examiner* — Joseph D Manoskey
(74) *Attorney, Agent, or Firm* — Blakely, Sokoloff, Taylor & Zafman, LLP

(57) ABSTRACT

Techniques and mechanisms for performing dequeue operations for agents of a test bench environment. In an embodiment, a first group of agents are each allocated a respective ripe reservation and a second set of agents are each allocated a respective unripe reservation. Over time, queue management logic allocates respective reservations to agents and variously changes one or more such reservations from unripe to ripe. In another embodiment, an order of servicing agents allocated unripe reservations is based on relative priorities of the unripe reservations with respect to one another. An order of servicing agents allocated ripe reservations is on a first come, first served basis.

20 Claims, 8 Drawing Sheets

500

502 / 504

```
package progressive_fair_queues is

type NATURAL_ARRAY is array (natural range <>) of natural;
function alertsig_resolution_function(a : NATURAL_ARRAY) return natural;

subtype alertsig is alertsig_resolution_function natural;

constant NO_RESERVATION : natural;
type integer_queue_pt is protected

        procedure          enqueue (constant v : in    integer; signal   s : inout alertsig);
        procedure          dequeue   (variable v : out   integer; variable reservation : inout natural);

        impure function    occupancy return natural;

end protected;

end package;
```

```
package body progressive_fair_queues is

function alertsig_resolution_function(a : NATURAL_ARRAY) return natural is
        begin return 0; end;

constant NO_RESERVATION : natural := natural'high;

type integer_queue_pt is protected body                          -- 522

        type node_t;
        type node_ptr is access node_t;
        type node_t is record
                val   : integer;
                nxt   : node_ptr;
        end record;

        impure function new_circular_singleton return node_ptr is -- 524
                variable nd : node_ptr := new node_t;
                begin
                        nd.nxt := nd;
                        return nd;
                end;

        variable q_head : node_ptr := new_circular_singleton;     -- 526
        variable q_tail : node_ptr := q_head;
        variable q_max  : natural := 1;
        variable q_num  : natural := 0;

        variable r_head : node_ptr := new_circular_singleton;     -- 528
        variable r_tail : node_ptr := r_head;
        variable r_max  : natural := 1;
        variable r_num  : natural := 0;

        variable u_head : node_ptr := new_circular_singleton;     -- 530
        variable u_tail : node_ptr := u_head;
        variable u_max  : natural := 1;
        variable u_num  : natural := 0;

variable next_res_val : natural := NO_RESERVATION-3;
```

```
procedure     enqueue (constant v : in integer; signal s : inout alertsig) is
        variable p : node_ptr;
        begin

542     if q_num = q_max then
                p := new node_t;
                p.nxt := q_head.nxt;
                q_head.nxt := p;
                q_max := q_max + 1;
        end if;

544     q_head := q_head.nxt;
        q_head.val := v;
        q_num := q_num + 1;

        if u_num /= 0 then

546             if r_num = r_max then
                        p := new node_t;
                        p.nxt := r_head.nxt;
                        r_head.nxt := p;
                        r_max := r_max + 1;
                end if;

548             r_head := r_head.nxt;
                r_head.val := u_tail.val;
                u_tail := u_tail.nxt;
                r_num := r_num+1;
                u_num := u_num-1;

        end if;

550     s <= 0;
        end;
```

```
procedure dequeue (variable v: out integer; variable reservation : inout natural) is
        variable p : node_ptr;
        variable i : natural;
begin
        if reservation = NO_RESERVATION then
                if (q_num > r_num) and (u_num = 0) then
                        v := q_tail.val;
562                     q_tail := q_tail.nxt;
                        q_num := q_num-1;
                else
                        if u_num = u_max then
                                p := new node_t;
                                p.nxt := u_head.nxt;
564                             u_head.nxt := p;
                                u_max := u_max + 1;
                        end if;
                        u_head := u_head.nxt;
                        u_head.val := next_res_val;
566                     u_num := u_num + 1;
                        reservation := next_res_val;  -- returned reservation
                        next_res_val := (next_res_val + 1) mod NO_RESERVATION;
                end if;
        else
        p := r_tail;
        i := r_num;
        while (i /= 0) loop
                if (p.val = reservation) then
                        reservation := NO_RESERVATION;
                        v := q_tail.val;
                        q_tail := q_tail.nxt;
                        q_num := q_num - 1;
568                     p.val  := r_tail.val;
                        r_tail := r_tail.nxt;
                        r_num := r_num - 1;
                        return;
                else
                        i := i-1; p := p.nxt;
                end if;
        end loop;
        end if;
end dequeue;

impure function occupancy return natural is
          begin return q_num; end;
end protected body integer_queue_pt;
end package body;
```

FIG. 5D

METHOD, APPARATUS AND SYSTEM FOR MANAGING QUEUE OPERATIONS OF A TEST BENCH ENVIRONMENT

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

BACKGROUND

1. Technical Field

Embodiments discussed herein generally relate to providing access to a queue to multiple agents. More particularly, certain embodiments relate to managing operation of a queue for a test bench environment.

2. Background Art

In current test benches and other software environments, queueing systems allow a queue to grow whenever a producer process needs an enqueue operation to be performed and the queue has all queue entries currently occupied. Such queue growth allows for all items to be enqueued and eventually dequeued for any subsequent processing.

However, such conventional dequeue systems do not guarantee service of all enqueued items in instances where there are multiple consumer processes variously dequeueing from the same queue. For example, if a dequeue operation does not succeed in a VHDL test bench environment, the process which invokes the dequeue operation is put into a wait state. It is possible, depending on ordering of process execution by a simulation kernel or similar software, for a consumer process to be starved as one or more other consumer processes take freshly enqueued elements before the starved process gets resumed by the kernel.

As the size, complexity and speed of test bench (or other) software environments continues to grow, they are increasingly sensitive to inefficiencies in resource allocation and utilization. Accordingly, there is a growing premium placed on incremental improvements in how queueing systems operate for such environments.

BRIEF DESCRIPTION OF THE DRAWINGS

The various embodiments of the present invention are illustrated by way of example, and not by way of limitation, in the figures of the accompanying drawings and in which:

FIGS. 5A through 5D are respective hardware description code illustrating elements of queue management logic according to an embodiment.

DETAILED DESCRIPTION

Embodiments discussed herein generally relate to the operation of a queue such as one in a test bench environment for verifying a device under test. In an embodiment, one or more producer agents of a software environment enqueue items which are to be variously dequeued each by, or otherwise on behalf of, a respective consumer agent of multiple consumer agents. Queue management logic may operate to determine whether and/or how an item is to be dequeued on behalf of a consumer agent. The queue management logic may maintain information identifying sets of consumer agents, where servicing of a dequeue request may be based on whether a consumer agent is currently one of a particular set of agents. In an embodiment, a set of agents may be defined as those consumer agents which are currently allocated a type of reservation for having a next request serviced. With respect to the servicing of a dequeue (or other) request, an agent currently allocated a reservation may have priority over another agent which is not currently allocated a reservation. A reservation may be allocated to a process based on a failure of a request on behalf of that process.

Reservations may be classified into various reservation types including, for example, a ripe reservation type and an unripe reservation type. With respect to the servicing of a request, an agent currently allocated an unripe reservation may be preferred over another agent which is also currently allocated an unripe reservation of a comparatively lower age, seniority or other priority value. Additionally or alternatively, an agent currently allocated a ripe reservation may, with respect to the servicing of a request, have priority over another agent which is currently allocated an unripe reservation—e.g. regardless of some age, seniority or other priority value.

An order of servicing processes allocated unripe reservations may be based on an order of priority of the unripe reservations. Additionally or alternatively, a servicing of processes allocated ripe reservations may be on a first come, first served basis. In an embodiment, reservations may be variously changed over time from unripe to ripe—e.g. based on a dequeue access to the queue.

Figure 1:
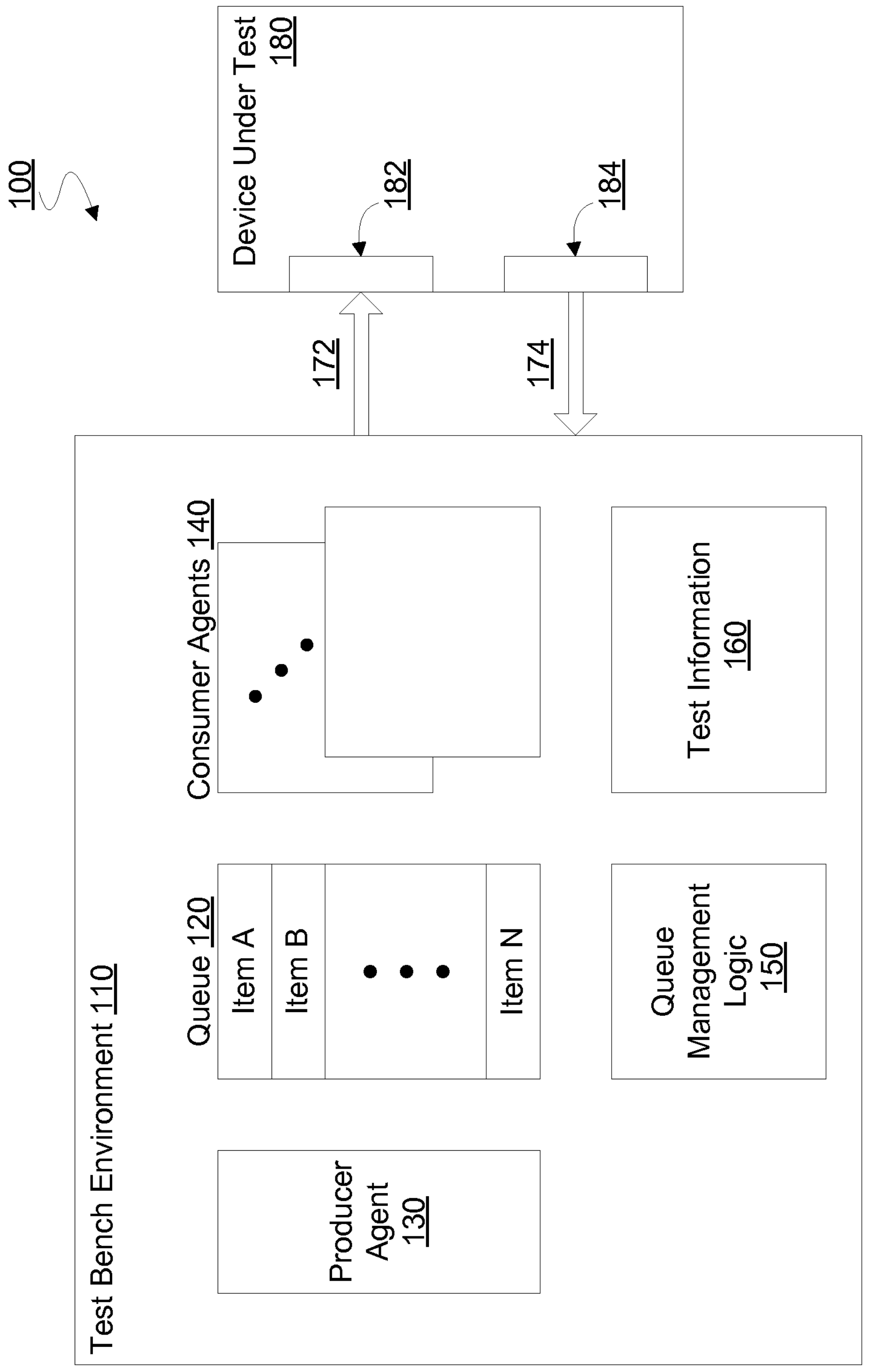
FIG. 1 is a block diagram illustrating elements of a system to perform dequeue operations according to an embodiment.

FIG. 1 illustrates elements of a system 100 for performing dequeue operations according to an embodiment. System 100 may include a computer platform such as that of a server or personal computer including, but not limited to, a desktop, laptop, tablet or the like. In an embodiment, system 100 includes a network of various computer platforms. Such a network may include one or more of a local area network (LAN), a virtual LAN (VLAN), a wide area network (WAN), an Internet or any various other computer networks.

Although certain embodiments are not limited in this regard, system 100 may include agents, each including integrated circuitry and/or executing software, to evaluate the performance of an integrated circuit design. By way of illustration and not limitation, system 100 may include a test bench environment 110 comprising one or more agents—e.g. including processes variously executing with a processor and a memory (not shown)—to perform stimulus-response exchanges for verifying performance of a device under test 180.

In an embodiment, device under test 180 includes a physical prototype (or other hardware version) of one or more integrated circuits. The one or more ICs may be synthesized, for example, based on a description thereof in Verilog, Very-high-speed Integrated Circuits (VHSIC) Hardware Description Language (or VHDL) or any other hardware description language (HDL). Alternatively, device under test 180 may include a software model of such one or more integrated circuits. For example, device under test 180 may be a modeled device which is verified for accurate operation, or its inaccuracies exposed, by a test bench environment 110. Such a model may be compiled by a simulation kernel (not shown) along with agents of test bench environment 110 which are to perform stimulus-response exchanges with the model. For example, the device under test 180 may be a software model compiled based on a HDL description such as one of those discussed above.

In the illustrative embodiment of system 100, test bench environment 110 may include one or more driver processes to send stimulus 172 to an interface 182 of device under test 180. Based on such stimulus 172, device under test 180 may perform operations which result in a response 174 being provided via an interface 184 of device under test 180. Interfaces 182, 184 may be the same interface of device under test 180, although certain embodiments are not limited in this regard. Test bench environment 110 may perform an analysis based on stimulus 172 and/or response 174 to determine, for example, whether device under test 180 meets one or more performance criteria. Such testing/verification may include communications and evaluations which are adapted from existing test bench technology (which are not discussed herein to avoid obscuring features of certain embodiments). Certain embodiments are not limited with respect to the particular device under test 180 and/or the particular information exchanged in stimulus 172 or response 174.

In an embodiment, test bench environment 110 includes or is coupled to a repository (e.g. including random access memory or other data storage media) of test information 160 for evaluation of device under test 180. For example, test information 160 may include data to be used in generating stimulus 172. Such data may include one or more records (and/or other data structures) representing, for example, Ethernet packets, transmissions on a bus (e.g. PCI, PCIe and/or the like) or any of a variety of other communications. Alternatively or in addition, test information 160 may include data received in response 174. Alternatively or in addition, test information 160 may include the results of analysis based on stimulus 172 and response 174. In certain embodiments, test information includes control information and/or metadata associated with other data in test information 160.

Test bench environment 110 is just one example of an embodiment wherein different agents variously submit dequeue requests for some item or items of the same queue. For example, one or more producer agents of test bench environment 110—e.g. including the illustrative producer agent 130—may enqueue items to a queue 120. Queue 120 may include a circular queue, a linked list or any of a variety of additional or alternative data structures capable of enqueueing/dequeueing items. Some or all such items may each include or reference a respective task to be subsequently performed by an available agent of test bench environment 110—e.g. by an available one of multiple consumer agents 140.

By way of illustration and not limitation, at a particular time queue 120 may include items A, B, . . . , N which each correspond to a different respective task stored as a record or other data structure in test information 160. Over time, various requests may be generated—each by, or otherwise on behalf of, a respective one of consumer agents 140—where each request is for an item or items to be dequeued from queue 120. Such a request may be specific to a targeted item in queue 120, or generic for any next available item in queue 120.

In an embodiment, logic of test bench environment 110 operates to provide both fairness and forward progress with respect to how consumer agents 140 request—e.g. vie with one another for—items in queue 120 (and/or tasks corresponding to such items). For example, queue management logic 150 of test bench environment 110 may variously detect dequeue requests for respective ones of consumer agents 140 and perform operations for determining whether and/or how such dequeue requests are to be serviced.

Such operations may include queue management logic 150 variously allocating reservations each to a respective one of consumer agents 140. For providing fairness in the servicing of dequeue requests, an agent which has been allocated such a reservation may have priority over another agent which has not been allocated a reservation. Alternatively or in addition, an agent which has been allocated a reservation of greater priority (e.g. a reservation allocated earlier in time) may have a request serviced before any request for an agent allocated a reservation of lower priority (e.g. a reservation allocated comparatively later in time).

For providing forward progress in the servicing of dequeue requests, queue management logic 150 may distinguish between different types of reservations—e.g. including two types referred to herein as an “unripe” reservation type and a “ripe” reservation type. Queue management logic 150 may maintain and/or implement a preference order, among agents allocated unripe reservations, with respect to whether any one such an agent is to have a dequeue request serviced on its behalf. For example, a set of agents who have each been allocated a respective unripe reservation may be ordered according to respective times when such unripe reservations were allocated.

In the illustrative embodiment of system 100, queue management logic 150 may variously allocate to some or all of consumer agents 140 respective reservations indicating priority with respect to whether a dequeue operation is to be performed on behalf of a particular one of consumer agents 140. As queue management logic 150 processes enqueue requests for producer agents such as 130 or dequeue requests for consumer agents 140, such reservations may be variously updated (e.g. given higher priority, ripened, deallocated, etc.) to maintain fairness and forward progress in the servicing of future dequeue requests.

Figure 2:
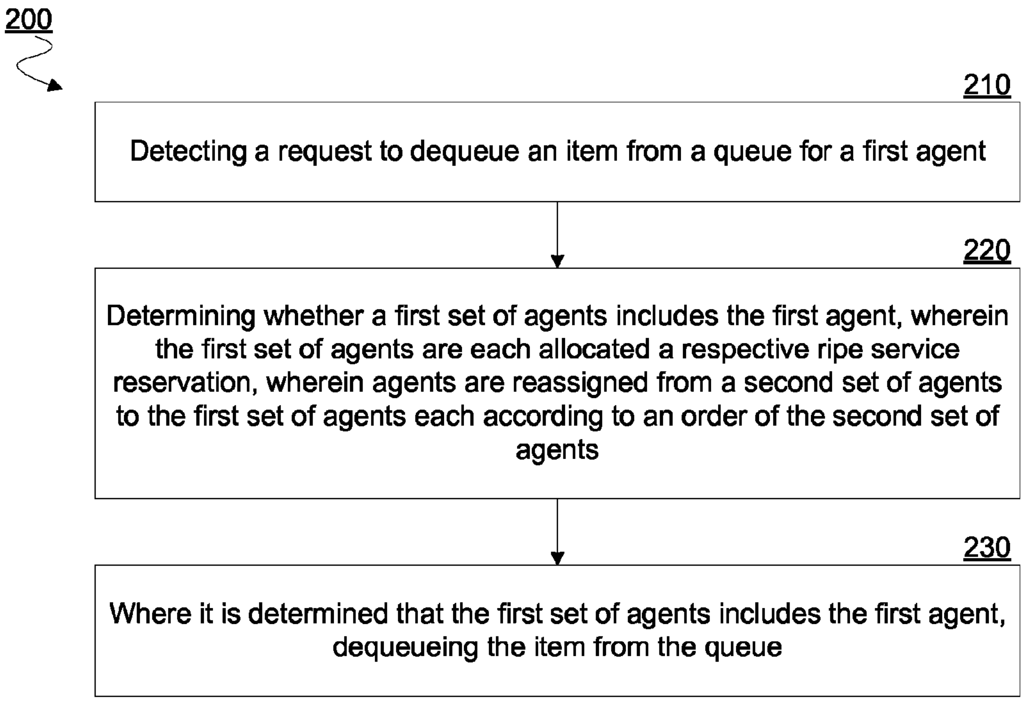
FIG. 2 is a flow diagram illustrating elements of a method according to an embodiment for determining whether to perform a dequeue operation.

FIG. 2 illustrates elements of a method 200, according to an embodiment, for determining whether a dequeue request is to be serviced. The dequeue request may, for example, be issued by (or otherwise on behalf of) an agent such as one of consumer agents 140. In an embodiment, method 400 is performed by an agent having some or all of the functionality of queue management logic 150.

Method 200 may include, at 210, detecting a request to dequeue an item from a queue for a first agent. The first agent may be one of a plurality of agents on whose behalf requests are variously processed according to techniques of method 200. Such requests may include only dequeue requests, although certain embodiments are not limited in this regard. For example, such requests may each be for the dequeueing of a respective item from the same queue.

The request detected at 210 may be for dequeueing from a queue of a test bench environment, although certain embodiments are not limited in this regard. For example, the queue may include items which each represent respective stimuli to be applied to an interface of the device under test. Alternatively or in addition, the queue may include items which each represent a respective response received via an interface of the device under test. Alternatively or in addition, the queue may include items which each represent a respective communication to be exchanged between agents of the test bench environment—e.g. independent of the device under test.

In response to the request detected at 210, method 200 may include, at 220, determining whether a first set of agents includes the first agent. The first set of agents may each be allocated a respective ripe service reservation. Agents may be variously reassigned from a second set of agents to the first set of agents—e.g. each according to an order of the second set of agents. As discussed herein, reassigning of an agent to the first set of agents may be in response to a change to a differential between a size (e.g. a total number of enqueued items) of the queue and a size (e.g. a total number of agents) of the first set of agents.

In an embodiment, the second set of agents are each allocated a respective unripe service reservation. Agents may each be assigned to the second set of agents based on a respective failed dequeue request on behalf of that agent. Assigning an agent to the second set of agents may be, or otherwise include, allocating that agent an unripe reservation. Reassigning an agent to the first set of agents from the second set of agents may be, or otherwise include, changing an unripe reservation of the agent to a ripe reservation. Removal of an agent from the first set of agents (or from the second set of agents) may include deallocating a reservation for that agent. The set of ripe reservations may include reservations that are guaranteed to succeed on a next dequeue attempt—e.g. because for the N items currently in the queue, the reservation is one of the N oldest. All other reservations may be unripe, and an agent attempting to dequeue with an unripe reservation is not guaranteed access to an enqueued item, at least not until enough new items are enqueued to make that unripe reservation ripe.

In an embodiment, a set of agents is specific to a particular resource of the test bench environment (or other system) and/or specific to a particular access type. For example, the first set of agents and the second set of agents may each be only for respective agents allocated reservations for dequeue requests targeting a particular queue. However, a set of agents may, in other embodiments, additionally or alternatively be for agents allocated reservations (whether ripe or unripe) for requests regarding different types of accesses to same resource and/or regarding access to another resource (e.g. including another queue).

Where it is determined that the first set of agents includes the first agent, method 200 may further comprise, at 230, dequeueing the item. In an embodiment, the dequeueing is performed at 230 regardless of any order of agents assigned to the first group of agents. For example, inclusion of the first agent in the first set of agents may be a sufficient condition which is determinative of an evaluation as to whether the dequeue request is to be performed for the first agent. Alternatively or in addition, such an evaluation may be independent of a type of criteria—e.g. including a seniority as compared to some other reservations in the same set of agents—which might otherwise be applied when the reservation was an unripe reservation.

Figure 3:
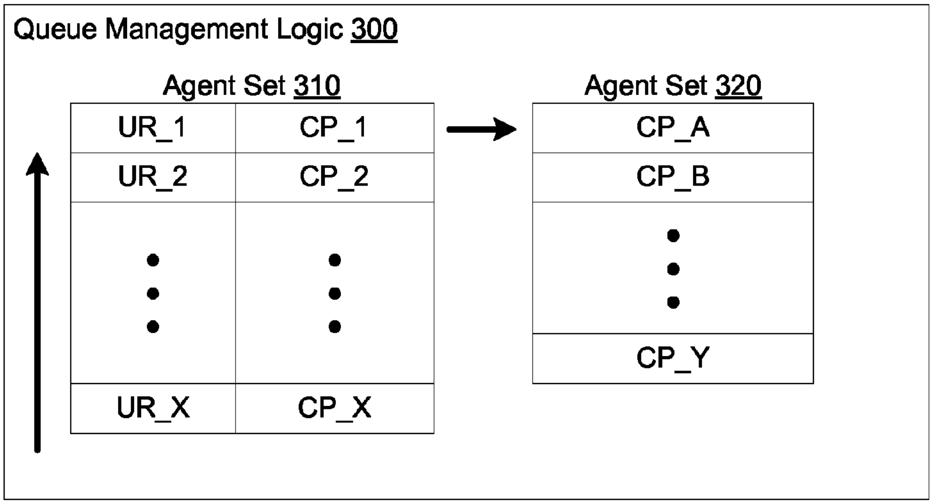
FIG. 3 is a block diagram illustrating elements of logic for managing dequeue operations according to an embodiment.

FIG. 3 illustrates elements of queue management logic 300 for processing a dequeue request according to an embodiment. Queue management logic 300 may include some or all of the features of queue management logic 150, for example. In an embodiment, queue management logic 300 performs operations such as those of method 200.

Queue management logic 300 may include circuit logic and/or executing software to control access to a queue or other resource—e.g. including determining whether a request to dequeue an item from a queue is to be serviced, or whether that request is to fail. Queue management logic 300 may be a single software process or, alternatively, may be distributed across multiple processes of a software platform or other environment such as test bench environment 110. By way of illustration and not limitation, queue management logic 300 may include an instantiation of an object comprising a data structure—e.g. including a queue—and one or more methods, procedures or other software mechanisms for controlling access to such a data structure. In an embodiment, various consumer agents may perform procedures calls of the instantiated object to request access to the data structure. Such method calls may invoke software mechanisms for the allocation/deallocation of reservations to provide fairness and forward progress in the servicing of such requests. In an embodiment, mechanisms may be used to assure that operations performed by queue management logic 300 keep data within queue management logic 300 consistent in the face of critical sections performed on behalf of agents that compete for the same queue and management resources and therefore must be mutually exclusive for the duration of the critical sections. In an embodiment, the methods may achieve mutual exclusivity of critical sections by being encapsulated in instances of protected types—e.g. of a VHDL language.

For example, queue management logic 300 may identify that a process (or other hardware and/or software agent) is associated with a particular request to access a queue or other data structure. The request may be generated by the process or on behalf of the process by some other agent. Servicing of the request may include dequeueing from a queue an item which represents a task for that process to subsequently perform. In an embodiment, queue management logic 300 may variously allocate agents respective reservations, each reservation for use in determining when a request is to be serviced on behalf of the associated agent. A reservation may be issued to an agent, for example, based on a failure of (e.g. a service denial for) a dequeue request which was submitted by or otherwise on behalf of that agent.

A reservation may include or be associated with a respective reference value for comparing a priority (e.g. seniority) of that reservation with that of a different reservation for another agent. In an embodiment, queue management logic 300 provides functionality for classifying different types of reservations—e.g. including an unripe reservation type and a ripe reservation type. One set of agents may be identified by queue management logic 300 based on such agents each being allocated a respective unripe reservation. Additionally or alternatively, another set of agents may be identified based on such agents each being allocated a respective ripe reservation.

A reservation may be considered unripe, for example, insofar as an agent allocated an unripe reservation has a relatively qualified priority with respect to the servicing of a next dequeue request for that agent. By contrast, an agent allocated a ripe reservation may, with respect to the servicing of a next dequeue request for that agent, have a priority which is not limited by the same type of qualification which applied to the unripe reservation.

Queue management logic 300 may include or have access to information identifying a set of agents (or simply "agent set") each of which are currently allocated a respective unripe reservation. Alternatively or in addition, queue management logic 300 may include or have access to information identifying another set of agents each of which are currently allocated a respective ripe reservation. By way of illustration and not limitation, queue management logic 300 may include or have access to information identifying an agent set 310 for unripe reservations and an agent set 320 for ripe reservations. Certain embodiments maintain ripe and unripe sets in separate data structures—e.g. wherein the ripe set is unordered and the unripe set is ordered by arrival for fairness and forward progress. Such separation into separate data structures may facilitate efficiency in processing or conceptual clarity, for example. However, alternative embodiments maintain all reservations as a single ordered set and simply consider the N most senior reservations of the ordered set to be ripe.

At a given time, agent set 310 may include agents CP_1, CP_2, . . . , CP_N which are currently allocated unripe reservations. For the purpose of evaluating dequeue (or other) requests, agent set 310 may be ordered according to some seniority or other priority. For example, agent set 310 may include agent identifiers CP_1, CP_2, . . . , CP_N for respective consumer processes (or other agents) and corresponding indices UR_1, UR_2, . . . , UR_N for ordering the agent identifiers. Indices UR_1, UR_2, . . . , UR_N may include or otherwise reference respective seniority values indicating how long each unripe reservation has been allocated to its respective process. Queue management logic 300 may move processes into higher relative priority within agent set 310 as other processes are moved out of agent set 310. An agent may be removed from agent set 310 based on a dequeue (or other) request being serviced on its behalf. Alternatively or in addition, an agent may be removed from agent set 310 based on the agent being reassigned to another agent set 320. In an embodiment, agent set 320 is for agents which are currently allocated a ripe reservation.

Reassignment of an agent from agent set 310 to agent set 320 may be in response to a change in a size of the queue—e.g. relative to a size of the agent set 320. For example, a total number of items enqueued in queue 120 may incrementally increase as some point, in response to a producer agent making a task available for subsequent processing by some consumer agent. Such an incremental increase in queue size may change (e.g. increase) a differential between that queue size and a total number of agents currently assigned to agent set 320. The change in the size differential represents an opportunity to ripen a highest priority agent in the ordered agent set 310, by moving that highest priority agent to agent set 320.

Figure 4:
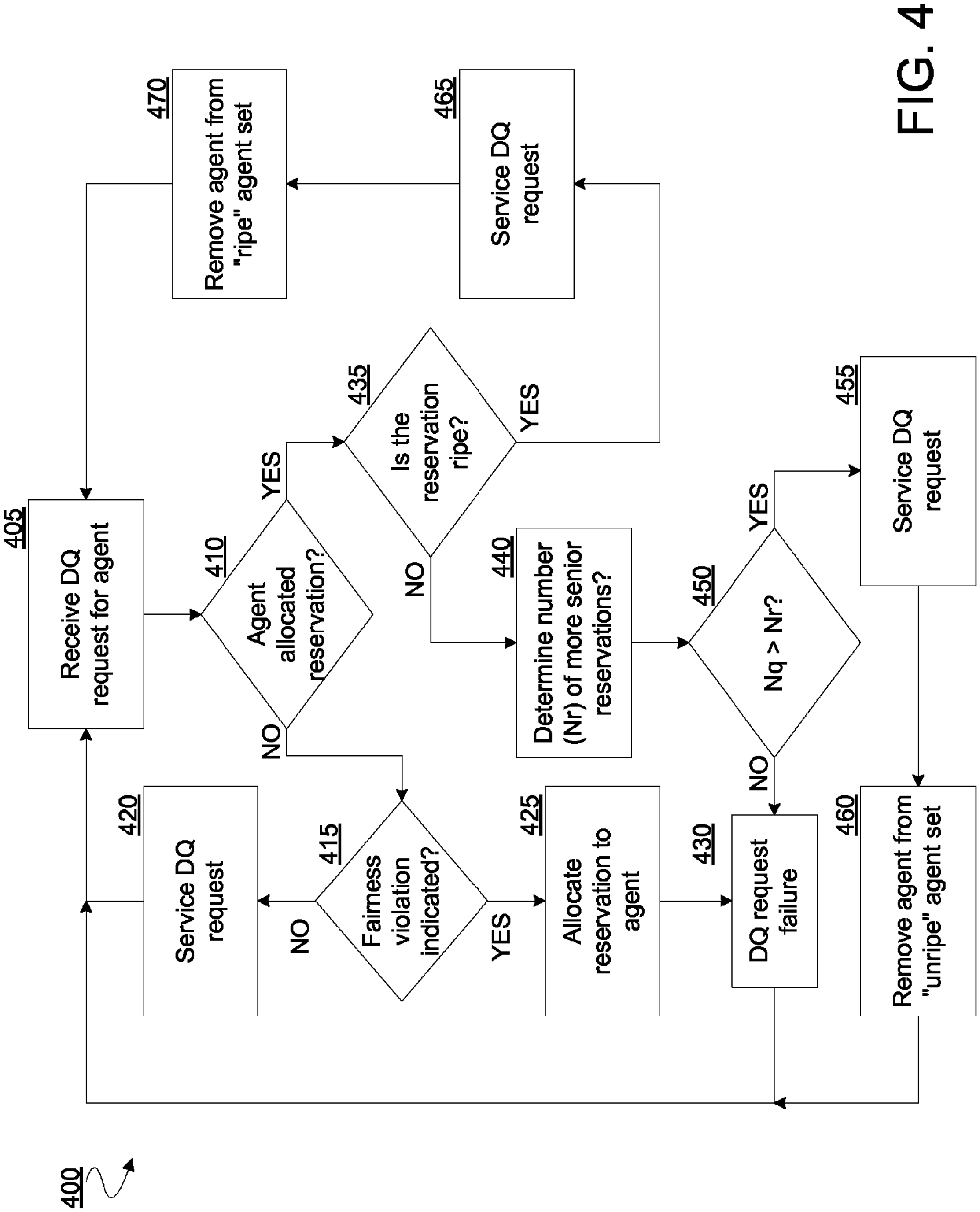
FIG. 4 is a flow diagram illustrating elements of a method according to an embodiment for processing a dequeue request.

FIG. 4 illustrates elements of a method 400 for processing a dequeue request according to an embodiment. Method 400 may include some or all of the features of method 200, for example. In an embodiment, method 400 is performed by hardware and/or software logic having some or all of the features of queue management logic 300.

Method 400 may include, at 405, receiving for an agent a dequeue request which requests the dequeueing of an item from a queue such as queue 120. The dequeue request detected at 120 may, for example, include a method call of an instantiated object which includes or otherwise provides access to the queue. The dequeue request may be generated by the agent or by some management process on behalf of that agent—e.g. where the request is intended for that agent to perform a task corresponding to any item dequeued in the servicing of the request. In an embodiment, method 400 includes or is otherwise based on a determination (not shown) that at least one item is available in the queue when the request is received at 405.

In an embodiment, method 400 may, at 410, determine whether the agent is currently allocated a reservation which applies to a request type of the dequeue request. Where no such reservation has been allocated to the agent, method 400 may, at 415, determine whether a fairness criteria would be violated by a servicing of the dequeue request. One example of a fairness criteria is that a later-in-time request for one agent will not be serviced before a next request for another agent, where a most recent earlier-in-time request for that other agent was denied service. Any of a variety of additional or alternative fairness criteria may be applied in the determining at 415.

Where it determined at 415 that the fairness criteria would not be violated, method 400 may service the dequeue request, at 420. By contrast, where the determining at 415 indicates that servicing the request would violate the fairness criteria, a reservation may be allocated to the agent, at 425. In an embodiment, the reservation allocated at 425 is initially an unripe reservation—e.g. where a current number of ripe reservations exceeds some reference value such as a fixed threshold number or a total number of items currently in the queue. Alternatively or in addition, a dequeue request failure may be communicated, at 430, to indicate that the request received at 405 will not be serviced.

Where it is determined at 410 that a reservation is currently allocated to the agent, method 400 may, at 435, determine whether the allocated reservation is currently ripe. The determining at 435 may, for example, correspond to the determining at 210 as to whether the agent is one of a group of agents which are allocated respective ripe reservations. Where the allocated reservation is not a ripe reservation (e.g. and is thus unripe), method 400 may determine, at 440, a total number (Nr) of currently-allocated reservations which are more senior (or otherwise have a higher priority) with respect to the reservation determined to be unripe at 415. At 450, a determination is made as to whether a total number (Nq) of items currently in the queue is greater than Nr. If Nq does not exceed Nr, the dequeue request fails, at 430.

Where the number Nq of enqueued items exceeds the number of currently-allocated, more senior reservations, the dequeue request may be serviced, at 455. The servicing at 455 may take place because the queue has enough items to accommodate future requests for all agents allocated either a ripe reservation or a higher priority unripe reservation. Since the request is serviced for the agent at 455, the agent may be removed at 460 from the unripe agent set (or otherwise has its reservation deallocated).

Where it is determined at 435 that the agent has been allocated a ripe reservation, method 400 may service the dequeue request, at 465. The servicing at 465 may be independent of any relative priority among the currently-allocated ripe reservations (e.g. among their respective agents). Since the request is serviced for the agent at 465, the agent may be removed at 470 from the ripe agent set (or otherwise has its reservation deallocated). Placement of a new item into the queue by a producer may provide an opportunity to reclassify another currently-allocated reservation from an unripe reservation type to a ripe reservation type.

FIG. 5A shows hardware description code 500 (in this case, VHDL code) representing features of queue management logic according to an embodiment. Hardware description code 500 may additionally or alternatively represent object-oriented programming (OOP) software logic which, when instantiated, provides a queue and mechanisms for managing access to the queue according to techniques discussed herein.

In an embodiment, hardware description code 500 defines, at 502, a subtype alertsig for coordination between agents variously accessing the queue. Such agents may include, for example, one or more producer processes to enqueue items to the queue and/or a plurality of consumer processes to variously dequeue items from the queue. In an embodiment, a signal S of type alertsig may be declared so that one or more "alerter" processes may variously communicate alerts using S to one or more "alertee" processes that wait for such alerts. In an embodiment, such an alert may occur through a VHDL transaction. An alerter process may signal an alert transaction by assigning a value—e.g. zero ("0")—to the altersig variable S. Although certain embodiments are not limited in this regard, an alertee process may detect such an alert by waiting for an event on the VHDL pre-defined signal-valued attribute S'TRANSACTION—e.g. during a process suspension based on a VHDL WAIT instruction that references this VHDL attribute.

At 504, hardware description code 500 defines a protected data type integer_queue_pt for implementing an integer queue to be accessed according to techniques discussed herein. The integer_queue_pt type defines an enqueue procedure for a producer process to enqueue an item to the queue. Also defined is a dequeue procedure for consumer processes to variously dequeue items from the queue. In an embodiment, enqueue calls always succeed—e.g. where the queue grows to accommodate additional items, as needed. Alternatively or in addition, dequeue calls may succeed only when there is an item in the queue that will not violate criteria for fairness and forward-progress among consumer requests. A fairness criteria may provide that any consumer process that fails in an attempt to dequeue an item will have an opportunity to subsequently succeed with a later attempt before any competing process' dequeue attempt that occurs later in time than the failed attempt. A forward progress criteria may provide that any repeated attempts by a process to dequeue an item will eventually succeed (e.g. assuming sufficient items get enqueued). Because consumer processes may need to suspend to allow items to arrive into a queue, an alertsig variable such as S may be declared and made accessible by all relevant producers and consumers for detection of such item arrival.

FIG. 5B shows hardware description code 520 representing features of queue management logic according to an embodiment. Hardware description code 520 provides some class definitions for the progressive_fair_queues package defined in hardware description code 500. For example, hardware description code 520 includes, at 522, the beginning of a definition of an integer_queue_pt protected data type. A function new_circular_singleton may also be defined, at 524, for the creation of a circular queue data structure. In an embodiment, hardware description code 520 includes, at 526, variables defining at least some current state of a queue to be accessed according to an embodiment. Hardware description code 520 may also include variables defining current state of a data structure for identifying allocated ripe reservations, at 528, and of another data structure for identifying allocated unripe reservations, at 530.

Unripe reservations may ripen in an order in which they are allocated. By way of illustration and not limitation, available unripe reservation values may comprise a set of N non-negative integers [0 . . . N−1]. The value of an unripe reservation to be allocated may be determined by a modulo N addition of one (1) to the value of a preceding allocated unripe reservation. In such an embodiment, the value N may be special—e.g. used to denote the absence of a reservation. For example, N may be represented as a symbolic constant, NO_RESERVATION and may be as large as the highest number of simultaneous outstanding reservations that can exist.

FIG. 5C shows additional hardware description code 540 for implementing queue management according to an embodiment. Hardware description code 540 may operate in combination with hardware description code 500, 520, for example. More particularly, hardware description code 540 defines operations performed by an enqueue procedure such as that set forth for the progressive_fair_queues package at 504.

The enqueue definition may include, at 542, instructions to extend the size of the queue if the queue needs to accommodate a next item which is the subject of an enqueue procedure call. In an embodiment, instructions 544 of hardware description code 540 are for value—e.g. a constant parameter v—to be stored to the next (e.g. newly created) head of the queue.

Hardware description code 540 may include additional instructions to be executed if the number of allocated unripe reservations is non-zero. For example, instructions 546 may increase the size of the list of ripe reservations. For example, hardware description code 540 may, at 546, increase (as needed) the allowable number of allocated ripe reservations and move the highest priority (e.g. oldest) unripe reservation into the group of ripe reservations, at 548. The instructions 546, 548 may avail of an opportunity, presented by the enqueueing of an item, for ripening a previously-allocated unripe reservation. Such instructions may be supplemented with additional instructions (not shown) which, for example, notify a process that its reservation has been ripened, so that the process may submit a new dequeue request to avail of the newly-ripened reservation. In other embodiments, the enqueueing of an item does not change the allocation of unripe reservations and/or ripe reservations to consumer processes.

FIG. 5D shows additional hardware description code 560 for implementing queue management according to an embodiment. Hardware description code 560 may operate in combination with hardware description code 500, 520, 540, for example. More particularly, hardware description code 560 defines operations performed by a dequeue procedure such as that set forth for the progressive_fair_queues package at 504.

Hardware description code 560 may include instructions 562—e.g. for an initial dequeue procedure call—to execute a dequeue request if it is immediately ripe (where there are enough queue items for ripe reservations and no unripe reservations allocated). Otherwise, the unripe reservation list is extended (as needed), at 564, and a new entry is added to the unripe reservation list, at 566.

Hardware description code 560 may include other instructions—e.g. for subsequent dequeue procedure calls—to go through the set of ripe reservations to see if one matches the reservation passed in the call to the dequeue procedure. If the passed reservation parameter matches a listed ripe reservation, at 568, the dequeue procedure of hardware description code 560 may return with a successful dequeue. Otherwise, the procedure may return with no changes to the ripe reservation list (e.g. where there is no item dequeued).

Figure 6:
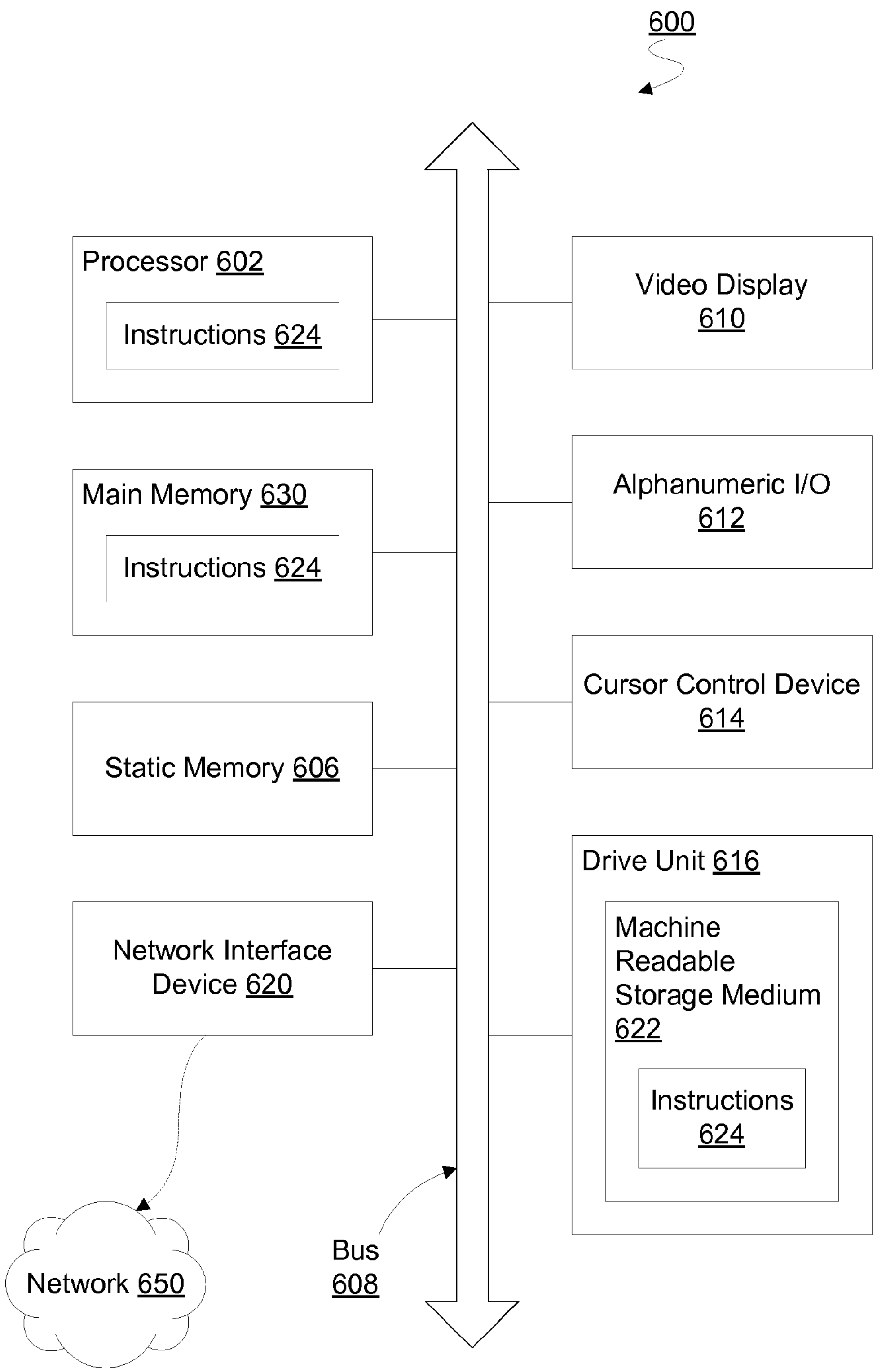
FIG. 6 is a block diagram illustrating elements of a system for operating a queue according to an embodiment.

FIG. 6 illustrates select elements of an exemplary form of a computer system 600 to manage queue access according to an embodiment. In various embodiments, the computer system 600 may operate as a standalone device or may be connected (e.g., networked) to other machines. In a networked deployment, the computer system 600 may operate in the capacity of a server or a client machine in server-client network environment, or as a peer machine in a peer-to-peer (or distributed) network environment. The computer system 600 may be a server, a personal computer (PC), a tablet PC or any machine capable of executing a group of instructions (sequential or otherwise) that specify actions to be taken by that machine. Further, while only a single machine is illustrated, the term "machine" shall also be taken to include any collection of machines that individually or jointly execute a group (or multiple sets) of instructions to perform any one or more of the methodologies discussed herein.

The exemplary computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)) to implement a display. The computer system 600 may also include an alphanumeric input device 612 (e.g., a keyboard), a user interface (UI) navigation device 614 (e.g., a mouse), a disk drive unit 616 and/or a network interface device 620.

The disk drive unit 616 may include a machine-readable storage medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable storage media. The software 624 may further be transmitted or received over a network 626 via the network interface device 620 utilizing any one of a number of well-known transfer protocols (e.g., HTTP). In an embodiment, execution of software 624 is to manage reservations to access a queue or other resource according to an embodiment.

While the machine-readable storage medium 622 is shown in an exemplary embodiment to be a single medium, the term "machine-readable storage medium" should be taken to include a single storage medium or multiple storage media (e.g., a centralized or distributed database, and/or associated caches and servers) that store the one or more sets of instructions. The term "machine-readable storage medium" shall also be taken to include any medium that is capable of storing a group of instructions for execution by the machine and that cause the machine to perform any one or more of the methodologies of the present invention, or that is capable of storing data structures utilized by or associated with such a group of instructions. The term "machine-readable storage medium" shall accordingly be taken to include, but not be limited to, solid-state memories, optical and magnetic storage media, etc.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a computer-readable storage medium includes non-transitory recordable/non-recordable media (e.g., read only memory (ROM), random access memory (RAM), magnetic disk storage media, optical storage media, flash memory devices, etc.).

Techniques and architectures for managing operation of a queue are described herein. In this description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method comprising:

detecting a request to dequeue a first item from a first queue on behalf of a first agent of a test bench environment, wherein the test bench environment evaluates a device under test;

in response to the request, determining whether a first set of agents includes the first agent, wherein each agent of the first set of agents is allocated a respective ripe service reservation, wherein agents are reassigned from a second set of agents to the first set of agents each according to an order of the second set of agents and in response to a respective change to a differential between a size of the first queue and a size of the first set of agents, wherein agents are each assigned to the second set of agents based on a respective failed dequeue request, and wherein the second set of agents are each allocated a respective unripe service reservation; and when it is determined that the first set of agents includes the first process, dequeueing the first item.

2. The method of claim 1, further comprising:

reassigning agents from the second set of agents to the first set of agents according to the order of the second set of agents.

3. The method of claim 1, wherein the dequeueing is performed based on the first set of agents including the first agent and regardless of any order of reservations allocated to agents assigned to the first group of agents.

4. The method of claim 1, wherein each agent of the first set of agents is allocated the respective ripe service reservation to avail of a dequeue service.

5. The method of claim 1, wherein the first set of agents is specific to reservations to avail of the first queue.

6. The method of claim 1, further comprising sending a signal indicating to the first agent an allocation of a ripe reservation to the first agent.

7. The method of claim 1, wherein the first queue includes items which each represent a respective set of stimuli to apply to an interface of the device under test.

8. The method of claim 1, wherein the first queue includes items which each represent a respective response received via an interface of the device under test.

9. The method of claim 1, wherein the first queue includes items which each represent a respective communication to be exchanged between agents of the test bench environment.

10. A non-transitory computer-readable storage medium having stored thereon instructions which, when executed by one or more processing units, cause the one or more processing units to perform a method comprising:

detecting a request to dequeue a first item from a first queue on behalf of a first agent of a test bench environment, wherein the test bench environment evaluates a device under test;

in response to the request, determining whether a first set of agents includes the first agent, wherein each agent of the first set of agents is allocated a respective ripe service reservation to avail of a dequeue service, wherein agents are reassigned from a second set of agents to the first set of agents each according to an order of the second set of agents and in response to a respective change to a differential between a size of the first queue and a size of the first set of agents, wherein agents are each assigned to the second set of agents based on a respective failed dequeue request, and wherein the second set of agents are each allocated a respective unripe service reservation; and when it is determined that the first set of agents includes the first process, dequeueing the first item.

11. The computer-readable storage medium of claim 10, further comprising reassigning agents from the second set of agents to the first set of agents according to the order of the second set of agents, wherein each of the agents is reassigned in response to a respective change to the differential between the size of the first queue and the size of the first set of agents.

12. The computer-readable storage medium of claim 10, wherein the dequeueing is performed based on the first set of agents including the first agent and regardless of any order of reservations allocated to agents assigned to the first group of agents.

13. The computer-readable storage medium of claim 10, wherein each agent of the first set of agents is allocated the respective ripe service reservation to avail of a dequeue service.

14. The computer-readable storage medium of claim 10, wherein the first queue includes items which each represent a respective set of stimuli to apply to an interface of the device under test.

15. The computer-readable storage medium of claim 10, wherein the first queue includes items which each represent a respective response received via an interface of the device under test.

16. The computer-readable storage medium of claim 10, wherein the order of the second set of agents is based on respective ages of agents assigned to the second set of agents.

17. The computer-readable storage medium of claim 10, further comprising assigning agents to the second set of agents each based on a respective failed dequeue request.

18. A device comprising:

a memory to store data in a first queue;

queue management logic comprising circuitry coupled to the memory, the queue management logic configured to:

detect a request to dequeue a first item from the first queue on behalf of a first agent of a test bench environment to evaluate a device under test;

determine, in response to the request, whether a first set of agents includes the first agent, wherein each agent of the first set of agents is allocated a respective ripe service reservation to avail of a dequeue service, wherein agents are reassigned from a second set of agents to the first set of agents each according to an order of the second set of agents and in response to a respective change to a differential between a size of the first queue and a size of the first set of agents, wherein agents are each assigned to the second set of agents based on a respective failed dequeue request, and wherein the second set of agents are each allocated a respective unripe service reservation; and dequeue the first item, when it is determined that the first set of agents includes the first agent.

19. The device of claim 18, the queue management logic further to reassign agents from the second set of agents to the first set of agents according to the order of the second set of agents.

20. The device of claim 18, wherein the queue management logic to dequeue the first item based on the first set of agents including the first agent and regardless of any order of reservations allocated to agents assigned to the first group of agents.

* * * * *